(12) United States Patent
Boyce et al.

(10) Patent No.: US 12,240,428 B2
(45) Date of Patent: Mar. 4, 2025

(54) GAS TURBINE ENGINE HEATERS

(71) Applicant: HotStart, Inc., Spokane, WA (US)

(72) Inventors: Benjamin J. Boyce, Spokane, WA (US); Michael T. Abbott, Spokane Valley, WA (US)

(73) Assignee: HotStart, Inc., Spokane, WA (US)

( * ) Notice: Subject to any disclaimer, the term of this patent is extended or adjusted under 35 U.S.C. 154(b) by 127 days.

(21) Appl. No.: 18/057,118

(22) Filed: Nov. 18, 2022

(65) Prior Publication Data
US 2023/0159013 A1 May 25, 2023

Related U.S. Application Data

(60) Provisional application No. 63/283,171, filed on Nov. 24, 2021.

(51) Int. Cl.
| | |
|---|---|
| *B60T 17/00* | (2006.01) |
| *B60T 13/26* | (2006.01) |
| *F01M 5/00* | (2006.01) |
| *F01P 7/16* | (2006.01) |

(52) U.S. Cl.
CPC .......... *B60T 17/002* (2013.01); *B60T 13/26* (2013.01); *F01M 5/001* (2013.01); *F01P 7/16* (2013.01)

(58) Field of Classification Search
CPC ....... B60T 17/002; B60T 13/26; F01M 5/001; F01P 7/16; F01P 3/20; F01P 11/20
See application file for complete search history.

(56) References Cited

U.S. PATENT DOCUMENTS

| | | | |
|---|---|---|---|
| 3,021,797 A | * | 2/1962 | Broadley .................. B61C 5/00 105/237 |
| D266,922 S | | 11/1982 | Reynolds |
| 4,481,773 A | * | 11/1984 | Sugito ..................... F02B 21/00 60/606 |
| D476,931 S | | 7/2003 | Fishburn et al. |
| 6,651,433 B1 | * | 11/2003 | George, Jr. ............... F02C 3/00 60/614 |
| D527,738 S | | 9/2006 | Pearson, Sr. |
| 7,401,578 B2 | | 7/2008 | Otterstrom et al. |
| D714,346 S | | 9/2014 | Swanson et al. |
| 9,222,491 B2 | | 12/2015 | Buzzard |

(Continued)

FOREIGN PATENT DOCUMENTS

| | | | |
|---|---|---|---|
| CN | 102309854 A | * | 1/2012 |
| JP | 2016156300 A | * | 9/2016 |

OTHER PUBLICATIONS

Machine Translation of CN102309854A PDF File Name: "CN102309854A_Machine_Translation.pdf".*

(Continued)

*Primary Examiner* — Grant Moubry
*Assistant Examiner* — Ruben Picon-Feliciano
(74) *Attorney, Agent, or Firm* — Lee & Hayes, P.C.

(57) ABSTRACT

An engine heater system for supplying compressed air to an air brake of a vehicle. The engine heater system including a gas turbine. A compressor fluidly coupled to an air reservoir of the vehicle. The air reservoir fluidly coupled to an air brake of the vehicle. A shaft rotatably attached between the gas turbine and the compressor, and when the gas turbine rotates the shaft, the compressor provides compressed air to the air reservoir of the vehicle for operating the air brake of the vehicle.

20 Claims, 5 Drawing Sheets

(56) References Cited

U.S. PATENT DOCUMENTS

| | | |
|---|---|---|
| D756,277 S | 5/2016 | Pasfield |
| D802,037 S | 11/2017 | Cordingley |
| D845,197 S | 4/2019 | Wang |
| D910,717 S | 2/2021 | Boyce |
| D920,383 S | 5/2021 | Macco |
| 2010/0021284 A1* | 1/2010 | Watson ............ F02C 6/14 126/400 |
| 2010/0288571 A1* | 11/2010 | Dewis ............ B60K 6/12 60/659 |

OTHER PUBLICATIONS

Machine Translation of JP2016156300A PDF File Name: "JP2016156300A_Machine_Translation.pdf" (Year: 2016).*

PDI Powerhouse Brochure AC APU, retrieved from <https://www.powerdrives.com/wp-content/uploads/2021/03/PDI-Powerhouse-Brochure-AC-APU.pdf>, Mar. 2021.

* cited by examiner

GAS TURBINE ENGINE HEATERS

RELATED APPLICATION

This application claims priority to U.S. Provisional Patent Application No. 63/283,171, filed on Nov. 24, 2021, the entirety of which is incorporated herein by reference.

BACKGROUND

Engine heaters maintain a temperature of an internal combustion engine. For example, fuel fired heaters are used onboard vehicles, such as locomotives, trucks, automobiles, ships, etc. in order to maintain the combustion engines within a desired temperature range. Moreover, reciprocating compressors maintain an air pressure of an air brake system. For example, slow speed reciprocating piston compressors, screw compressors, or other positive displacement compressors are used onboard vehicles in order to maintain an air pressure of an air brake system.

Locomotive idling is an unfortunate necessity. Besides additional fuel consumption and increased costs, idling produces emissions at the engine's least efficient operating point. Idling also produces noise. However, idling is necessary for the following reasons 1) to prevent the air brake system pressure from dropping below 90 psi, 2) to keep locomotive batteries charged, 3) to prevent the locomotive coolant from freezing in cold climates, 4) to keep oil from increasing in viscosity, and 5) to provide power for operator comfort systems.

Additionally, auxiliary load requirements have increased with the implementation of electronic monitoring equipment such as Positive Train Control (PTC). Presently locomotives are outfitted with Automatic Engine Start Stop Systems (AESS). The AESS will restart the engine for conditions where the engine temperature is too low (risk of freezing), and air brake pressure is too low (risk of brake release). The AESS will also stop the engine after 30 minutes of idling. Moreover, the AESS will restart the engine if a battery charge drops below a threshold.

Air brake pressure drop is the main reason for engine idling. Modern train systems lose up to 1 psi per minute at a rate of 60 cfm to 90 cfm per regulations set by AAR (Association of American Railroads). The regulations also state that the engine must restart if the brake line air pressure drops below 90 psi. Thus, a restart is likely every 50 minutes given this requirement. After multiple restarts the AESS will switch to remain idling.

In some onboard applications, fuel fired heaters may employ parasitic loads to maintain the engines within a desired temperature range. For example, fuel fired heaters may employ a fan and a pump to maintain the combustion engines within a desired temperature range. However, the fan and the pump may be parasitic loads on a battery of the vehicle. For example, the fan and the pump of the fuel fired heater may be powered by the battery of the vehicle, thereby reducing a charge of the battery of the vehicle.

Thus, there remains a need to develop new fuel fired heaters that provide compressed air, are more efficient, and are not a parasitic load on the vehicle.

BRIEF DESCRIPTION OF THE DRAWINGS

The detailed description is described with reference to the accompanying figures. The use of the same reference numbers in different figures indicates similar or identical items.

DETAILED DESCRIPTION

Overview

As noted above, reciprocating compressors may be employed for maintaining an air pressure of an air brake system of vehicles. This disclosure is directed to engine heater systems (e.g., microturbine auxiliary power units (APUs)) maintaining a diesel engine of a vehicle within a desired temperature and/or supplying compressed air to air brakes of the vehicle. Compared to conventional techniques, the engine heater systems described herein may be more efficient than running a main engine of a vehicle employed to do the same.

An example of an engine heater system that maintains a diesel engine of a vehicle within a desired temperature and/or supplies compressed air to air brakes of the vehicle may be an engine heater system like that seen in the figures. In some instances, the engine heater system may include a gas turbine and a compressor. The compressor may be fluidly coupled to an air reservoir of the vehicle, and the air reservoir may be fluidly coupled to the air brake of the vehicle. During rotation of the gas turbine, the compressor rotates and thereby supplies compressed air to the air reservoir of the vehicle. In turn, the air supplied to the air reservoir may be used to operate the air brake of the vehicle. Accordingly, this disclosure describes engine heater systems that may result in a more efficient operation of the vehicle.

While this application describes implementations that are described in the context of an onboard engine heater system for maintaining a diesel engine of a vehicle within a desired temperature and/or an air brake system of the vehicle within a desired pressure, the implementations described herein may be used in other environments and may be applicable in other contexts. For example, the engine heater systems may be located at any desired location, including with a generator (e.g., backup generator) located at a server farm, a hospital, a high-rise building, remote cell tower site, an urban cell tower site, an oil site, a gas site, etc.

Example Engine Heaters

Figure 1:
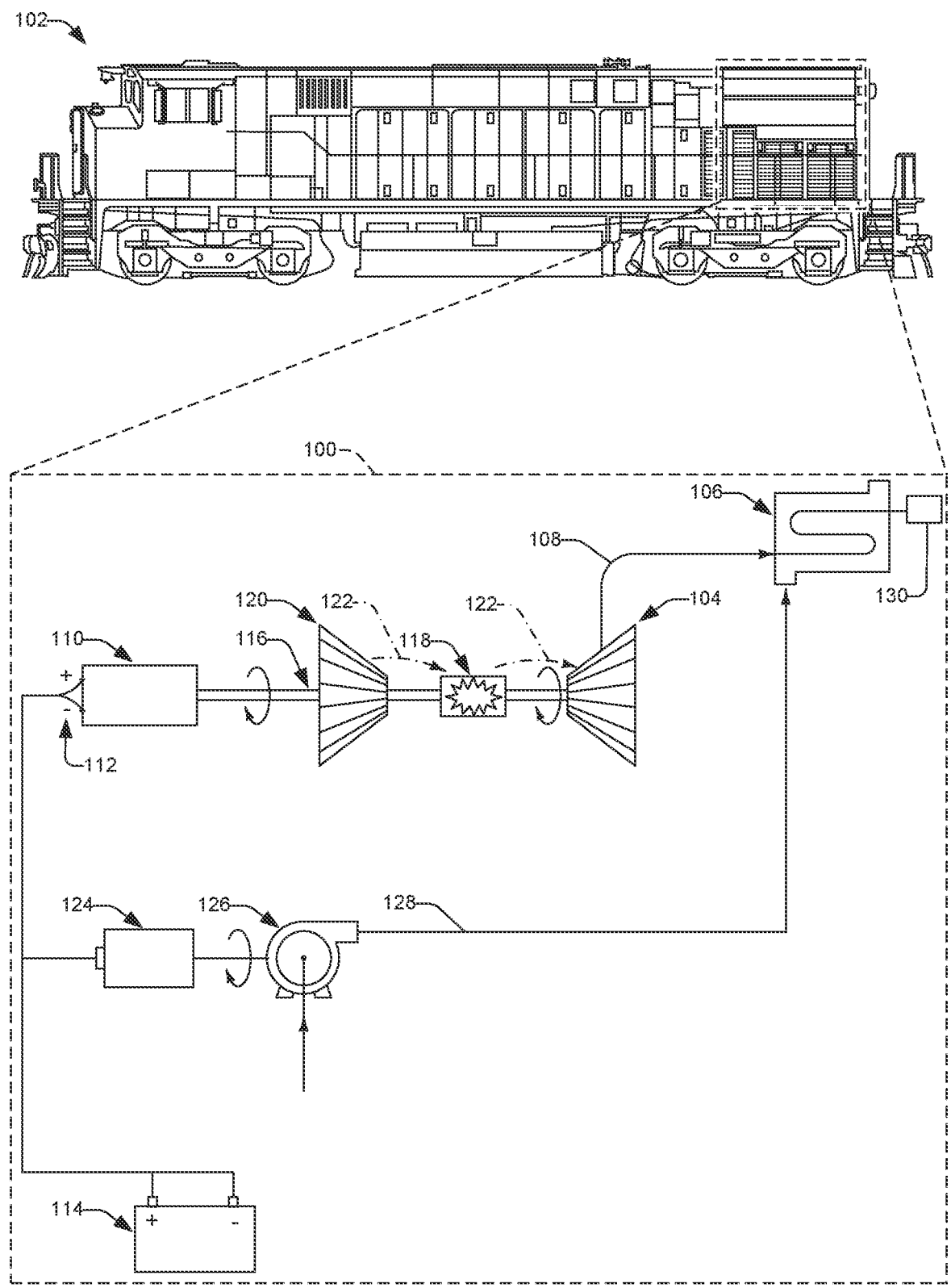
FIG. 1 illustrates an example engine heater system for heating a diesel engine of a vehicle, according to an embodiment in this disclosure.

FIG. 1 illustrates an example engine heater system 100 for heating a diesel engine of a vehicle 102. While FIG. 1 illustrates the vehicle 102 is a locomotive (e.g., a diesel electric locomotive), the vehicle 102 may be a ship, a truck, a car, etc. The engine heater system 100 may be onboard the vehicle 102. For example, the engine heater system 100 may be arranged on the vehicle 102 for heating the diesel engine of the vehicle 102 and/or for maintaining an air brake system of the vehicle 102 within a desired pressure.

The engine heater system 100 may include a gas turbine 104. A heat exchanger 106 may be fluidly coupled to an exhaust 108 of the gas turbine 104. An electric generator 110 may include connection members 112 may be coupled to a battery 114 of the vehicle 102. The battery 114 may be a battery bank of the vehicle 102. A shaft 116 may be rotatably attached between the gas turbine 104 and the electric generator 110.

A combustor 118 may be disposed proximate to the gas turbine 104. The combustor 118 is configured to heat air that is provided to the gas turbine 104. As such, the combustor 118 may be fluidly coupled to the gas turbine 104. The combustor 118 may use multiple different fuels. In an example, the combustor 118 may comprise a combustor that utilizes diesel fuel. The heated air acts on the blades of the gas turbine 104 to rotate the gas turbine 104. Rotation of the gas turbine 104 correspondingly rotates the shaft 116. When the gas turbine 104 rotates the shaft 116, the electric generator 110 charges the battery 114. Moreover, the heat exchanger 106 utilizes the exhaust 108 of the gas turbine 104 to keep the diesel engine of the vehicle 102 within a desired temperature range. The heat exchanger 106 may comprise a cross-flow heat exchanger, a counterflow heat exchanger, etc.

In one example, the heat exchanger 106 may utilize the exhaust 108 of the gas turbine 104 to heat engine coolant of the diesel engine of the vehicle 102 to keep the diesel engine within the desired temperature range. Additionally or alternatively, the heat exchanger 106 may utilize the exhaust 108 of the gas turbine 104 to heat engine oil of the diesel engine of the vehicle 102 to keep the diesel engine within the desired temperature range. Additionally or alternatively, the heat exchanger 106 may utilize the exhaust 108 of the gas turbine 104 to heat an engine coolant of the diesel engine of the vehicle 102 to keep a cab of the vehicle 102 at a desired temperature. As such, the exhaust 108 may be usable for beneficial purposes.

FIG. 1 illustrates that the engine heater system 100 may include a compressor 120. The compressor 120 may be a multistage air compressor (e.g., a two-spool multistage air compressor). The compressor 120 may be disposed proximate to the gas turbine 104 and may be attached to the shaft 116. The compressor 120 may force air 122 into the combustor 118. A fuel pump disposed with the combustor 118 may spray fuel (e.g., diesel fuel) into the combustor 118, where the sprayed fuel mixes with air and ignites. When the gas turbine 104 rotates the shaft 116, the shaft 116 rotates the compressor 120 to force the air 122 to the combustor 118. The compressor 120 may be fluidly coupled to an air reservoir (not shown in FIG. 1) of the vehicle 102. The air reservoir is fluidly coupled to the air brake of the vehicle 102 and during rotation of the gas turbine 104, the compressor 120 rotates to supply compressed air to the air reservoir of the vehicle 102 for operating the air brake of the vehicle 102 (discussed in more detail below).

The connection members 112 may further couple the electric generator 110 to an electric motor 124 of a coolant pump 126. When the gas turbine 104 rotates the shaft 116, the electric generator 110 may power the electric motor 124 of the coolant pump 126. The coolant pump 126 may force engine coolant 128 through the heat exchanger 106. The exhaust 108 of the gas turbine 104 may then heat the engine coolant 128 forced through the heat exchanger 106 by the coolant pump 126. In turn, the heated engine coolant 128 may be used to keep the diesel engine within the desired temperature range.

While FIG. 1 illustrates the coolant pump 126 that supplies the engine coolant 128 through the heat exchanger 106, additionally or alternatively, an oil pump (not shown) may be powered by the electric generator 110 to supply engine oil through the heat exchanger 106. In such an embodiment, the exhaust 108 of the gas turbine 104 may heat the engine oil and therein, the heated engine oil may be used to keep the diesel engine within the desired temperature range.

The heat exchanger 106 may be further fluidly coupled to an exhaust pipe 130 for venting the exhaust. While FIG. 1 illustrates the exhaust 108 of the gas turbine 104 heating an engine oil, the exhaust 108 of the gas turbine 104 may additionally or alternatively heat a hydraulic oil, a fuel (e.g., diesel fuel), etc.

Because the engine heater system 100 includes the gas turbine 104 that rotates the compressor 120 (via the shaft 116), charges the battery 114, and powers the coolant pump 126, rather than drawing power from the battery 114, the engine heater system 100 does not represent a parasitic load on the battery 114 of the vehicle 102. Consequently, the engine heater system 100 may be more efficient that traditional techniques. For example, because the gas turbine 104 rotates the compressor 120 and powers the coolant pump 126, the engine heater system 100 does not require power from the battery 114 to run the compressor 120 and/or the coolant pump 126, and instead charges the battery 114. Moreover, because the compressor 120 is rotated by the gas turbine 104 to supply compressed air to the air reservoir of the vehicle 102 for operating the air brake, the engine heater system 100 may be more efficient at supplying compressed air to the air brake of the vehicle 102 as compared to slow speed reciprocating piston compressors. Further, because the compressor 120 utilizes a high-speed rotating fan that utilizes centrifugal force to compress air, the compressor 120 may be physically smaller compared to slow speed compressors that are physically larger in size to displace the required air for high-flow and high-pressure requirements of the vehicle 102.

Another Example Engine Heater

Figure 2:
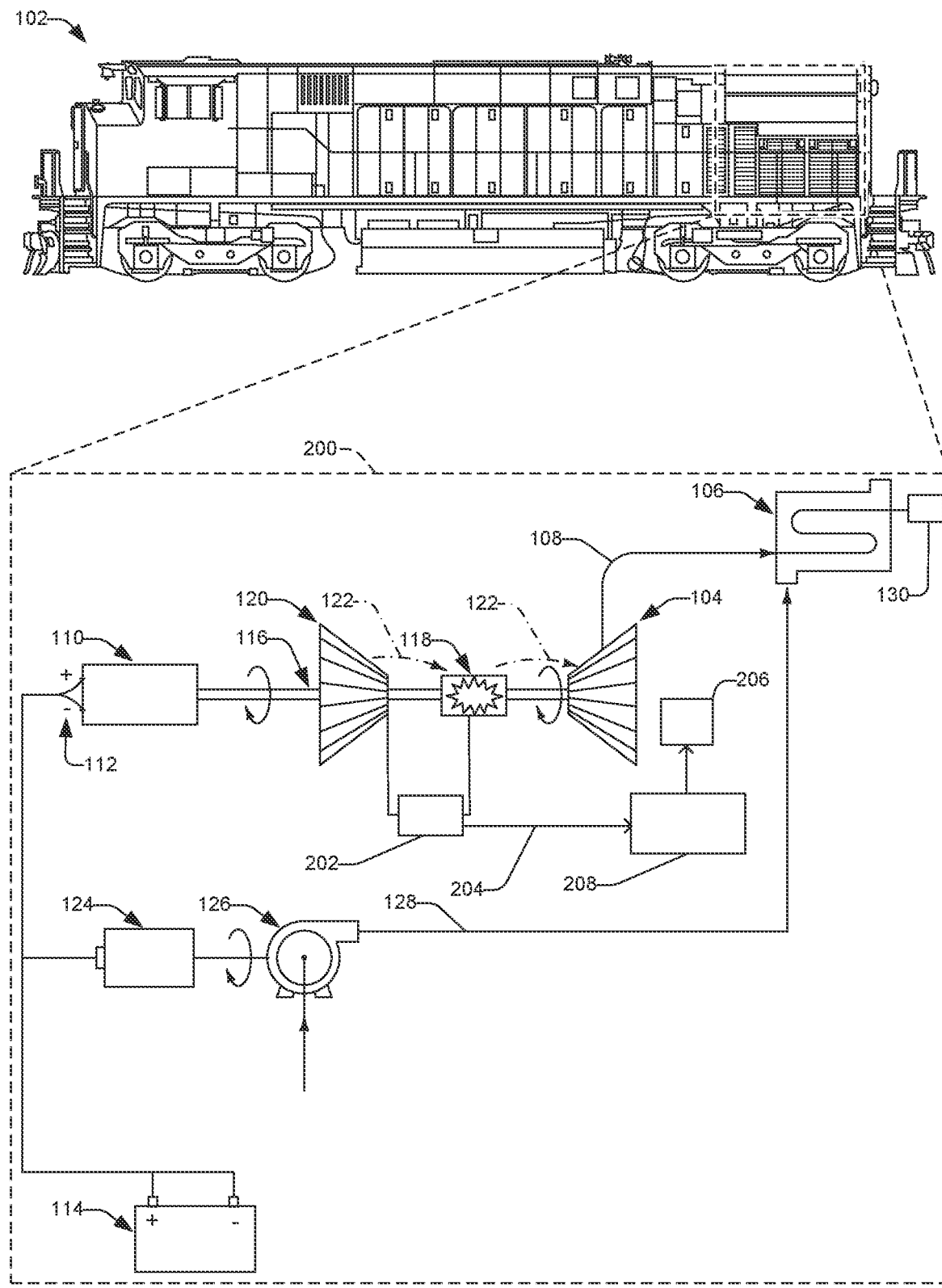
FIG. 2 illustrates another example engine heater system for supplying compressed air to an air brake of a vehicle, according to an embodiment in this disclosure.

FIG. 2 illustrates an embodiment of an engine heater system 200, similar to the engine heater system 100 in FIG. 1. However, the engine heater system 200 includes a multistage air compressor 202, according to an embodiment in this disclosure. Inasmuch as other components of the engine heater system 200 are similar to those of engine heater system 100, the reference numbers remain the same on the same parts for convenience.

The multistage air compressor 202 may comprise a two-spool multistage air compressor, for example. The multistage air compressor 202 may provide compressed air 204 to an air brake 206 of the vehicle 102 through a main air reservoir 208 of the vehicle 102. For example, the main air reservoir 208 of the vehicle 102 may be fluidly coupled to the air brake 206 of the vehicle 102, and the multistage air compressor 202 may provide compressed air 204 to the main air reservoir 208 fluidly coupled to the air brake 206 of the vehicle 102. The air brake 206 of the vehicle 102 may comprise a train air brake pipe. The multistage air compressor 202 may provide for maintaining air brake pressure while maintaining engine temperature without the main engine of a vehicle running. For example, the multistage air compressor 202 may provide for reduced idling and/or start-up of a main engine (main combustion engine) of a vehicle, where the main engine needs to be maintained within a desired temperature for operation and/or to maintain an air pressure of an airbrake system to prevent vehicle runaway.

The multistage air compressor 202 may be fluidly coupled to the train air brake pipe and/or a locomotive air compressor. The multistage air compressor 202 may be arranged with the compressor 120, the combustor 118, and/or the gas turbine 104. For example, the multistage air compressor 202 may be attached to the shaft 116 along with the compressor 120, the combustor 118, and/or the gas turbine 104. When the gas turbine 104 rotates the shaft 116, the shaft 116 rotates the multistage air compressor 202 to provide the compressed air 204 to the main air reservoir 208 of the vehicle 102 for operating the air brake 206 of the vehicle 102. While FIG. 2 illustrates the engine heater system 200 includes one shaft (e.g., shaft 116) the engine heater system 200 may include more than one shaft. For example, the engine heater system 200 may include a low-speed shaft and a high-speed shaft.

Another Example Engine Heater

Figure 3:
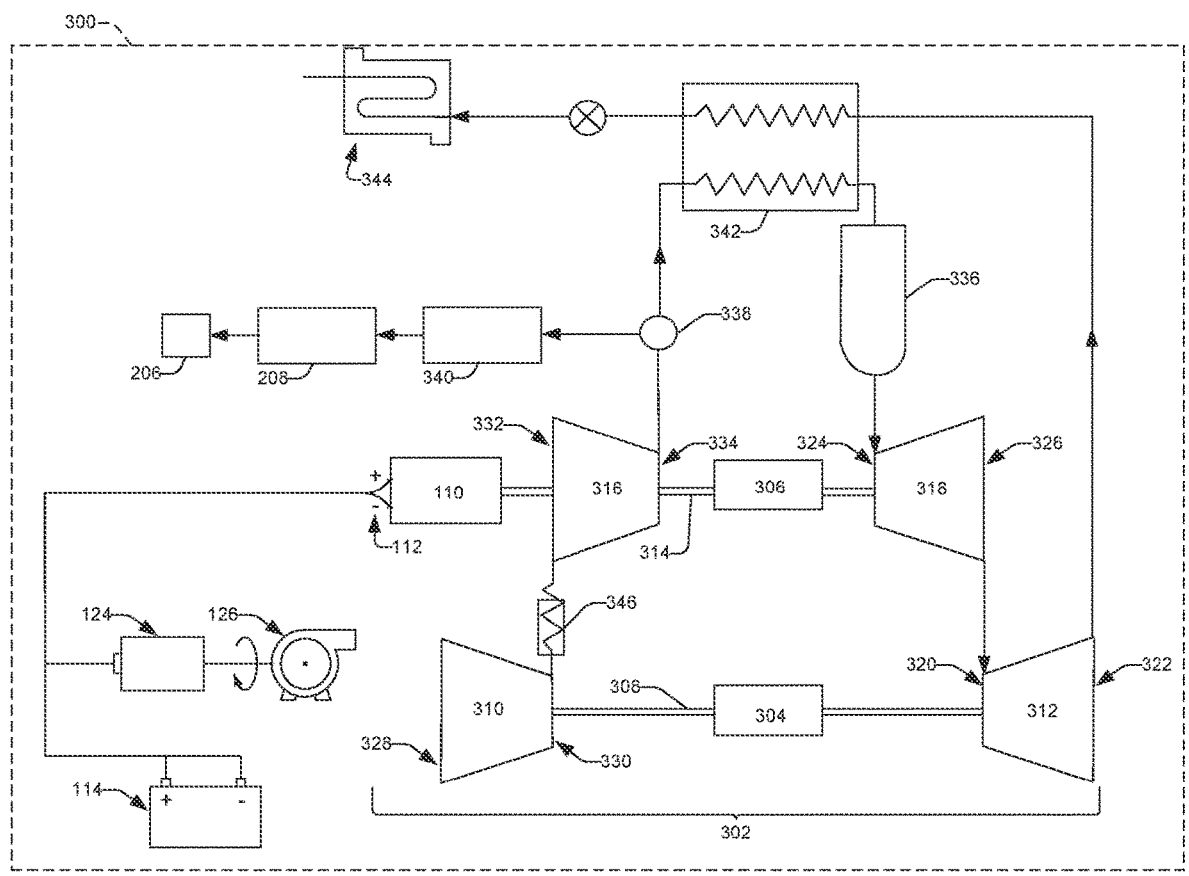
FIG. 3 illustrates another example engine heater system for supplying compressed air to an air brake of a vehicle, according to an embodiment in this disclosure.

FIG. 3 illustrates an embodiment of an engine heater system 300, similar to the engine heater system 100 in FIG. 1 and the engine heater system 200 in FIG. 2. However, the engine heater system 300 includes a two-spool multistage air compressor 302, according to an embodiment in this disclosure. Inasmuch as other components of the engine heater system 300 are similar to those of engine heater systems 100 and 200, the reference numbers remain the same on the same parts for convenience.

The two-spool multistage air compressor 302 will burn significantly less fuel than a locomotive prime mover engine while keeping the train ready for service and not idling the prime mover engine. The two-spool multistage air compressor 302 will make compressed air and enough heat in a compact package. The two-spool multistage air compressor 302 has the advantage over a reciprocating piston engine because the two-spool multistage air compressor 302 produces more power in a smaller and lightweight package as compared to the larger and heavier reciprocating piston engine producing less power. The two-spool multistage air compressor 302 used in a combined heat and power (CHP) application can be as high as 90% efficient use of the fuel energy potential. The two-spool multistage air compressor 302 has significantly lower emissions than a reciprocating piston engine.

The two-spool multistage air compressor 302 includes a low-speed spool 304 and a high-speed spool 306. The low-speed spool 304 includes a low-speed shaft 308 operably coupled between a low-speed compressor 310 and a low-speed turbine 312. The high-speed spool 306 includes a high-speed shaft 314 operably coupled between a high-speed compressor 316 and a high-speed turbine 318. The low-speed turbine 312 includes an intake side 320 opposite an exhaust side 322. The high-speed turbine 318 includes an intake side 324 opposite an exhaust side 326. The low-speed compressor 310 includes an inlet side 328 opposite an outlet side 330. The high-speed compressor 316 includes an inlet side 332 opposite an outlet side 334.

A combustor 336 may be disposed proximate to the intake side 324 of the high-speed turbine 318 and/or the intake side 320 of the low-speed turbine 312. The combustor 336 is configured to provide heated air to the high-speed turbine 318 and/or the low-speed turbine 312. The outlet side 334 of the high-speed compressor 316 may be disposed proximate to the combustor 336 and fluidly coupled via a valve 338 to the air reservoir 208 of the vehicle 102 fluidly coupled to the air brake 206 of the vehicle 102. Where during rotation of the high-speed shaft 314 via the high-speed turbine 318, the high-speed shaft 314 rotates the high-speed compressor 316, thereby increasing pressure at the outlet side 334 of the high-speed compressor 316 and supplying compressed air to the air reservoir 208 of the vehicle 102 for operating the air brake 206 of the vehicle 102. The high-speed compressor 316 may supply about 90 cfm at about 90-100 psi to the air brake 206 of the vehicle 102. As discussed above, regulations state that the main engine of a locomotive must restart if the brake line air pressure drops below 90 psi. Thus, because the high-speed compressor 316 may supply about 90 cfm at about 90-100 psi to the air brake 206 of the vehicle 102, the engine heater system 300 reduces main engine start-ups.

The high-speed shaft 314 may be operably coupled to the electric generator 110. Where the electric generator 110 is configured to charge the battery 114 as the high-speed turbine 318 rotates the high-speed shaft 314. While FIG. 3 illustrates the electric generator 110 operably coupled to the high-speed shaft 314, the electric generator 110 may be operably coupled to the low-speed shaft 308.

A heat exchanger 340 may be fluidly coupled to the outlet side 334 of the high-speed compressor 316. For example, the heat exchanger 340 may be fluidly coupled to the outlet side 334 of the high-speed compressor 316, via the valve 338. The heat exchanger 340 is configured to remove heat from the compressed air for heating an engine coolant and/or heating an engine oil. Because air increases in temperature when compressed, the air exiting the outlet side 334 of the high-speed compressor 316 may have an exit air temperature that is very high (e.g., about 437K or about 163C). The high temperature air exiting the outlet side 334 of the high-speed compressor 316 may provide for improved brake performance by preventing brake line freezing in cold temperatures. For example, subsequent to the heat exchanger 340 removing heat from the compressed air for heating an engine coolant and/or an engine oil, the elevated temperature heated air supplied to the air reservoir 208 of the vehicle 102 fluidly coupled to the air brake 206 of the vehicle may prevent brake line freezing in cold temperatures.

A recuperator 342 may be fluidly coupled to the outlet side 334 of the high-speed compressor 316. For example, the recuperator 342 may be fluidly coupled to the outlet side 334 of the high-speed compressor 316, via the valve 338, upstream of the combustor 336. The recuperator 342 may add heat to the compressed air before it enters the combustor 336. Because the recuperator 342 adds heat to the compressed air before it enters the combustor 336, the recuperator 342 may provide for reduced fuel consumption by the combustor 336. The valve 338 may be a pressure relief valve that splits the compressed air between the heat exchanger 340 and the recuperator 342. The compressed air produced by the high-speed compressor 316 may include a product air mass flow of about 0.038 kg/s (at standard temp of 20F and pressure of 14.7 psia), which equates to about 60 cfm flow, at about 100 psig pressure, and at about 120C.

A heat exchanger 344 may be fluidly coupled to the recuperator 342. Similar to the heat exchanger 106, the heat exchanger 344 may utilize an exhaust of the low-speed turbine 312 and/or the high-speed turbine 318 to keep the diesel engine of the vehicle 102 within a desired temperature range.

An intercooler 346 may be fluidly coupled between the low-speed compressor 310 and the high-speed compressor 316. The intercooler 346 may be a radiator heat exchanger configured to cool the compressed air downstream of the low-speed compressor 310, before the compressed air enters the high-speed compressor 316. The heat removed from the compressed air downstream of the low-speed compressor 310 may be used elsewhere. For example, the heat captured by the intercooler 346 may be used for cabin heating, engine oil heating, engine coolant heating, etc.

While FIG. 3 illustrates the engine heater system 300 includes a two-spool multistage air compressor, the engine heater system 300 may include other types of gas turbines (e.g., recuperated gas turbines). For example, the engine heater system 300 may include a two-spool with overhung high pressure (HP) spool turbine, a single shaft axi-centrifugal turbine, etc.

Compressed air may be required to maintain brake line pressure of the vehicle 102. Low brake pressure will result in a locomotive engine and attached air compressor restarting to charge the air pressure. The two-spool multistage air compressor 302 can be used to maintain brake line pressure and prevent locomotive engine and attached air compressor restarts to charge the air pressure. The two-spool multistage air compressor 302 can be used as a safety feature to prevent runaway trains when a main engine restart is not possible. Because the two-spool multistage air compressor 302 is relatively smaller in physical size and is relatively lighter in weight than a reciprocating engine compressor of similar power, weight savings and size savings are realized.

Example Engine Heater Process

Figure 4A:
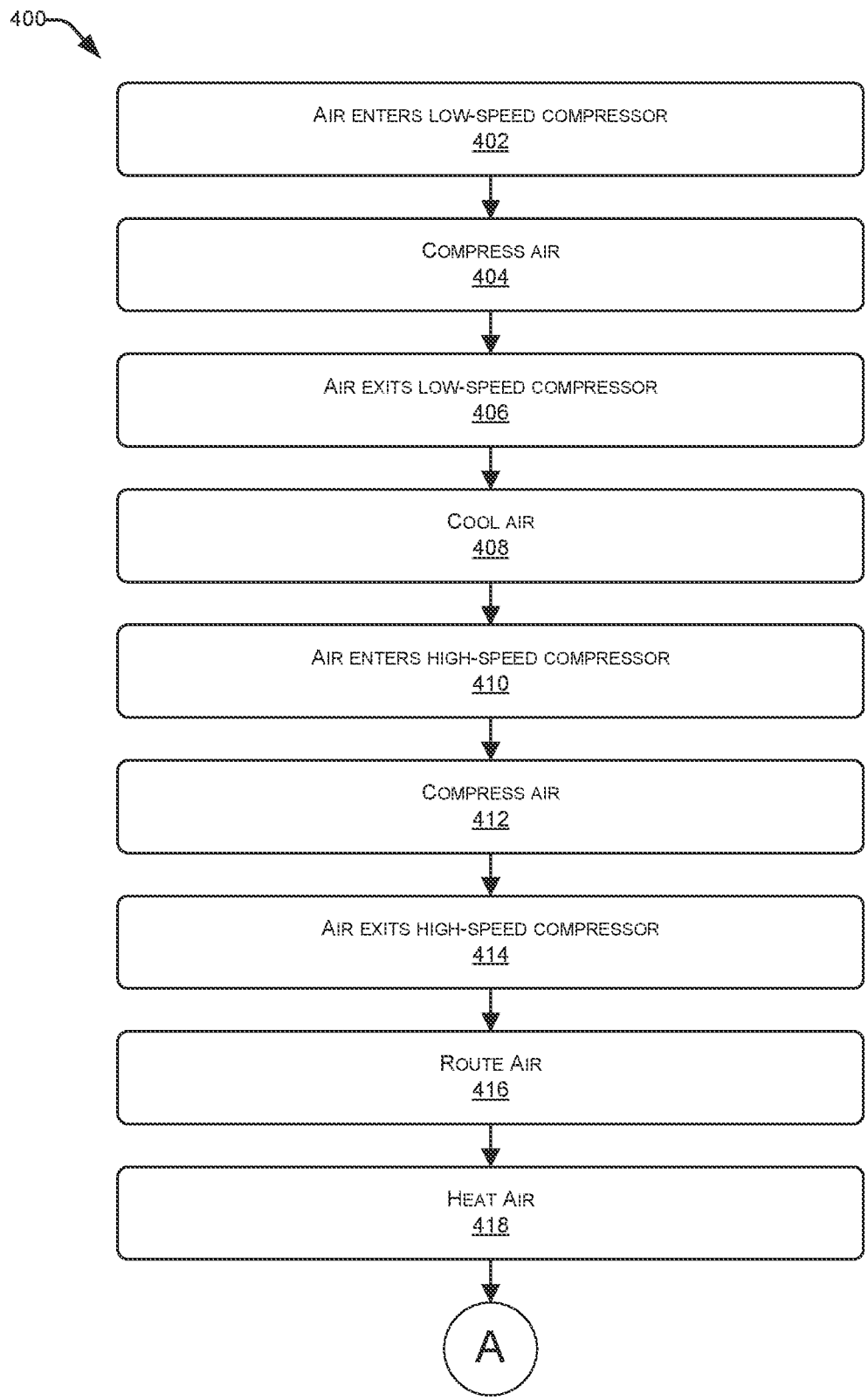
FIGS. 4A and 4B collectively illustrate an example process that the engine heater system of FIG. 3 may implement to supply compressed air to an air brake of a vehicle and maintain a diesel engine of the vehicle within a desired temperature, according to an embodiment in this disclosure.
Figure 4B:
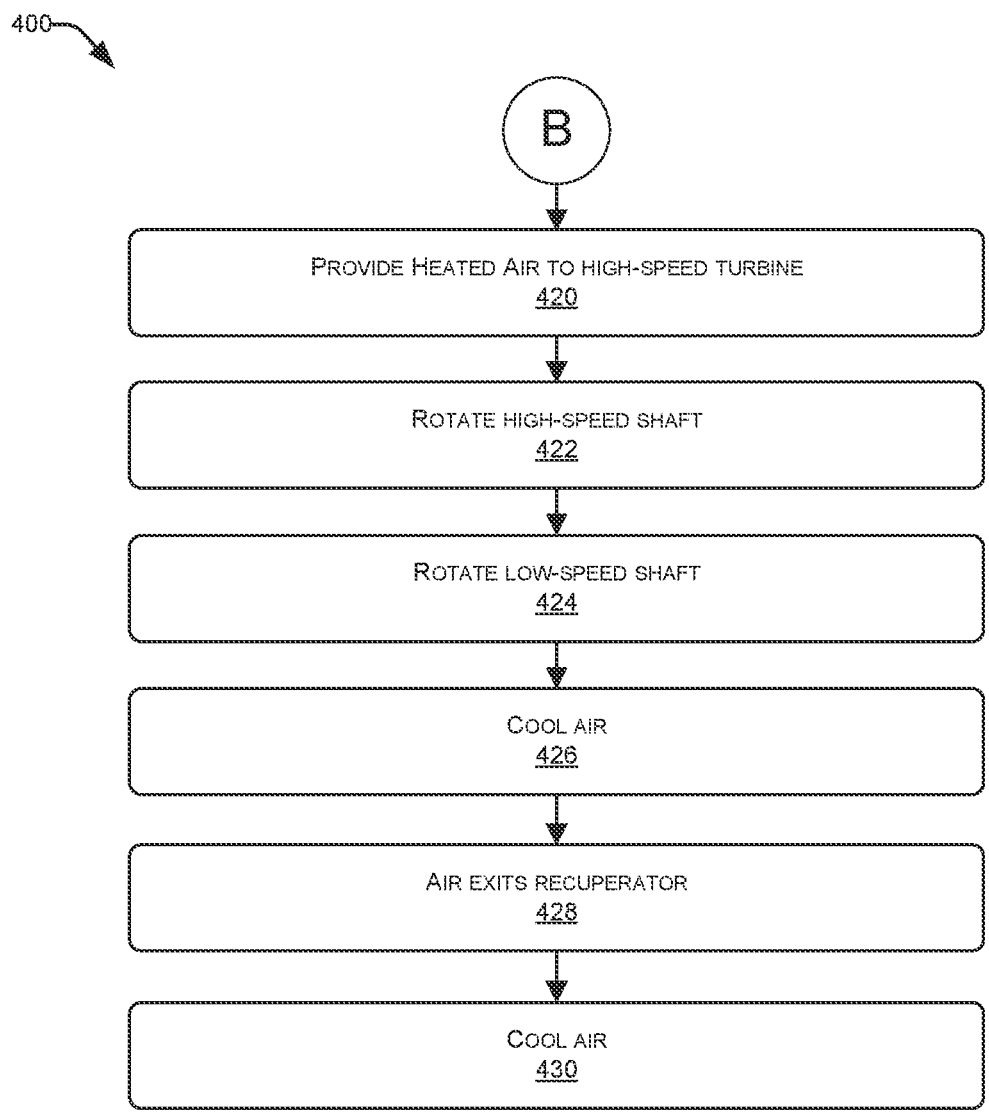

FIGS. 4A and 4B collectively illustrate an example process 400 that the engine heater system 300 may implement to supply compressed air to an air brake (e.g., air brake 206) of a vehicle (e.g., vehicle 102) and maintain a diesel engine of the vehicle within a desired temperature. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the process described herein may be performed, in whole or in part, by the engine heater system 100, the engine heater system 200, and/or a combination thereof.

At an operation 402, air may enter the low-speed compressor 310. For instance, outside air may enter the inlet side 328 of the low-speed compressor 310.

An operation 404 represents the low-speed compressor 310 compressing the air. For example, operation 404 may represent a first stage of air compression by the low-speed compressor 310. As a result of the low-speed compressor 310 compressing the air, the temperature of the air increases.

An operation 406 represents the compressed air exiting the low-speed compressor 310. For example, operation 406 may represent the compressed air exiting the first compression stage.

An operation 408 represents the intercooler 346 cooling the air. For example, the intercooler 346 may cool the compressed air downstream of the low-speed compressor 310, before the compressed air enters the high-speed compressor 316. The heat captured by the intercooler 346 may be used elsewhere in vehicle 102. For example, the heat captured by the intercooler 346 may be used for heating a cabin of the vehicle, heating an engine oil of the vehicle, heating an engine coolant of the vehicle.

An operation 410 represents the cooled air entering the high-speed compressor 316. For example, operation 410 may represent the cooled air entering a second stage of compression of the air via the high-speed compressor 316.

An operation 412 represents the high-speed compressor 316 compressing the air. For example, operation 412 may represent a second stage of air compression by the high-speed compressor 316. As a result of the high-speed compressor 316 compressing the air, the temperature of the air increases. Operation 412 may further represent the high-speed shaft 314 rotating the electric generator 110. Where the electric generator 110 may generate electricity to charge the battery 114, power the electric motor 124 of the coolant pump, power an electric motor of an oil pump, and/or power battery charger loads.

An operation 414 represents air exiting the high-speed compressor 316. For example, operation 414 may represent the compressed air exiting the second compression stage. During rotation of the high-speed shaft 314 via the high-speed turbine 318, the high-speed shaft 314 rotates the high-speed compressor 316, thereby increasing pressure at the outlet side 334 of the high-speed compressor 316 so that the air exits the high-speed compressor at the outlet side 334 of the high-speed compressor 316 to at least supply compressed air to the air reservoir 208 of the vehicle 102 for operating the air brake 206 of the vehicle 102.

An operation 416 represents routing the air exiting the high-speed compressor 316. For example, operation 416 may represent the valve 338 splitting the compressed air exiting the high-speed compressor 316 between the heat exchanger 340 and the recuperator 342.

An operation 418 represents heating the air. For example, operation 418 may represent the air routed to the recuperator 342 is heated by the recuperator 342. For example, the air routed to the recuperator 342 may be heated by heat energy removed, via the recuperator 342, from an exhaust exiting the exhaust side 322 of the low-speed turbine 312 to preheat the air before it enters the combustor 336.

An operation 420 represents providing heated air to the high-speed turbine 318. For example, operation 420 may represent the combustor 336 is configured to provide heated air to the high-speed turbine 318. For example, the combustor 336 may burn fuel (e.g., diesel fuel) to heat the air to add more energy to the air and provide the heated air to the intake side 324 of the high-speed turbine 318.

An operation 422 represents rotating the high-speed shaft 314. For example, operation 422 may represent the high-speed turbine 318 on the high-speed shaft 314 removing energy from the air and converting the energy to torque to spin the high-speed shaft 314.

An operation 424 represents rotating the low-speed shaft 308. For example, operation 424 may represent the low-speed turbine 312 on the low-speed shaft 308 removing energy from the air and converting the energy to torque to spin the low-speed shaft 308.

An operation 426 represents cooling the air. For example, operation 426 may represent the air (e.g., exhaust) exiting the exhaust side 322 of the low-speed turbine 312 is routed to the recuperator 342 and is cooled by the recuperator 342. For example, the air from the low-speed turbine 312 may be very hot (e.g., about 800K or about 526C), which is routed to the recuperator 342 to be cooled, via the recuperator 342, such that the air/exhaust heat energy is recovered by the recuperator 342 and transferred to the combustion air to reduce fuel consumption.

An operation 428 represents the air exiting the recuperator 342. For example, operation 428 may represent exhaust air leaving the two-spool multistage air compressor 302.

An operation 430 represents cooling the air. For example, operation 430 may represent the heat exchanger 106 removing heat from the exhaust air to heat engine coolant and/or engine oil. For example, coolant and/or oil pumps may move fluid through the heat exchanger 106 to remove heat from the exhaust air to heat the engine coolant and/or engine oil.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An engine heater system for supplying compressed air to an air brake of a vehicle, the engine heater system comprising:
   a gas turbine having an intake side opposite an exhaust side;
   a combustor disposed proximate to the intake side of the gas turbine, the combustor being configured to provide heated air to the gas turbine;
   a compressor having an inlet side opposite an outlet side, the outlet side being disposed proximate to the combustor and fluidly coupled to an air reservoir of the vehicle, the air reservoir being fluidly coupled to the air brake of the vehicle; and
   a shaft operably coupled between the gas turbine and the compressor,
   wherein during rotation of the shaft via the gas turbine, the shaft rotates the compressor, thereby increasing pressure at the outlet side of the compressor and supplying compressed air to the air reservoir of the vehicle for operating the air brake of the vehicle.

2. The engine heater system according to claim 1, wherein the compressor comprises a two-spool multistage air compressor, the two-spool multistage air compressor including a low-speed compressor and a high-speed compressor, and
   wherein the outlet side of the compressor includes an outlet side of the high-speed compressor.

3. The engine heater system according to claim 1, further comprising a heat exchanger fluidly coupled to the outlet side of the compressor upstream of the air reservoir of the vehicle, wherein the heat exchanger removes heat from the compressed air for heating an engine coolant or heating an engine oil.

4. The engine heater system according to claim 1, further comprising a recuperator fluidly coupled to the outlet side of the compressor upstream of the combustor, wherein the recuperator adds heat to the compressed air before the compressed air enters the combustor.

5. The engine heater system according to claim 1, wherein the shaft comprises a high-speed shaft, the engine heater system further comprising:
   an electric generator including connection members configured to couple to a battery of the vehicle, the electric generator attached to the high-speed shaft, and
   wherein the electric generator is configured to charge the battery as the gas turbine rotates the high-speed shaft.

6. The engine heater system of claim 5, wherein the electric generator further includes second connection members to couple to an electric motor of a coolant pump.

7. The engine heater system of claim 5, wherein the electric generator further includes third connection members to couple to an electric motor of an oil pump.

8. The engine heater system according to claim 1, wherein the engine heater system is onboard of the vehicle.

9. The engine heater system of claim 1, wherein the vehicle comprises a locomotive or a truck.

10. An engine heater system for supplying compressed air to an air brake of a vehicle, the engine heater system comprising:
    a combustor;
    a gas turbine;
    a compressor disposed proximate to the gas turbine and fluidly coupled to an air reservoir of the vehicle, the air reservoir being fluidly coupled to the air brake of the vehicle; and
    a shaft rotatably attached to the gas turbine and the compressor, wherein during operation of the gas turbine, the shaft rotates the compressor to supply compressed air to the air reservoir of the vehicle for operating the air brake of the vehicle.

11. The engine heater system according to claim 10, wherein the compressor comprises a two-spool multistage air compressor, the two-spool multistage air compressor including a low-speed compressor and a high-speed compressor, the high-speed compressor fluidly coupled to the air brake of the vehicle.

12. The engine heater system according to claim 10, further comprising a heat exchanger fluidly coupled the compressor upstream of the air reservoir of the vehicle, wherein the heat exchanger removes heat from the compressed air for heating an engine coolant or heating an engine oil.

13. The engine heater system according to claim 10, further comprising an electric generator including connection members configured to couple to a battery of the vehicle, the electric generator attached to the shaft, wherein the electric generator is configured to charge the battery as the gas turbine rotates the shaft.

14. The engine heater system of claim 13, wherein the electric generator further includes second connection members to couple to an electric motor of a coolant pump.

15. The engine heater system of claim 13, wherein the electric generator further includes third connection members to couple to an electric motor of an oil pump.

16. The engine heater system of claim 10, wherein the engine heater system is onboard of the vehicle, and wherein the vehicle comprises a locomotive.

17. An engine heater system for supplying compressed air to an air brake of a vehicle, the engine heater system comprising:
    a gas turbine;
    a combustor disposed proximate to the gas turbine, the combustor being configured to provide heated air to the gas turbine;
    a compressor disposed proximate to the combustor and fluidly coupled to an air reservoir of the vehicle, the air reservoir being fluidly coupled to the air brake of the vehicle; and
    a shaft operably coupled between the gas turbine and the compressor,
    wherein during rotation of the shaft via the gas turbine, the shaft rotates the compressor, thereby supplying compressed air to the air reservoir of the vehicle for operating the air brake of the vehicle.

18. The engine heater system according to claim 17, wherein the compressor comprises a two-spool multistage air compressor, the two-spool multistage air compressor including a low-speed compressor and a high-speed compressor, and
    wherein the high-speed compressor is fluidly coupled to the air reservoir of the vehicle.

19. The engine heater system according to claim 17, wherein the shaft comprises a high-speed shaft,
    the engine heater system further comprising:
    an electric generator including connection members configured to couple to a battery of the vehicle, the electric generator attached to the high-speed shaft, and
    wherein the electric generator is configured to charge the battery as the gas turbine rotates the high-speed shaft.

20. The engine heater system of claim 19, wherein the electric generator further includes:
    second connection members to couple to an electric motor of a coolant pump, or third connection members to couple to an electric motor of an oil pump.

* * * * *